June 3, 1930.  M. F. EMERSON  1,760,939
MOWER
Filed April 26, 1929  2 Sheets-Sheet 1
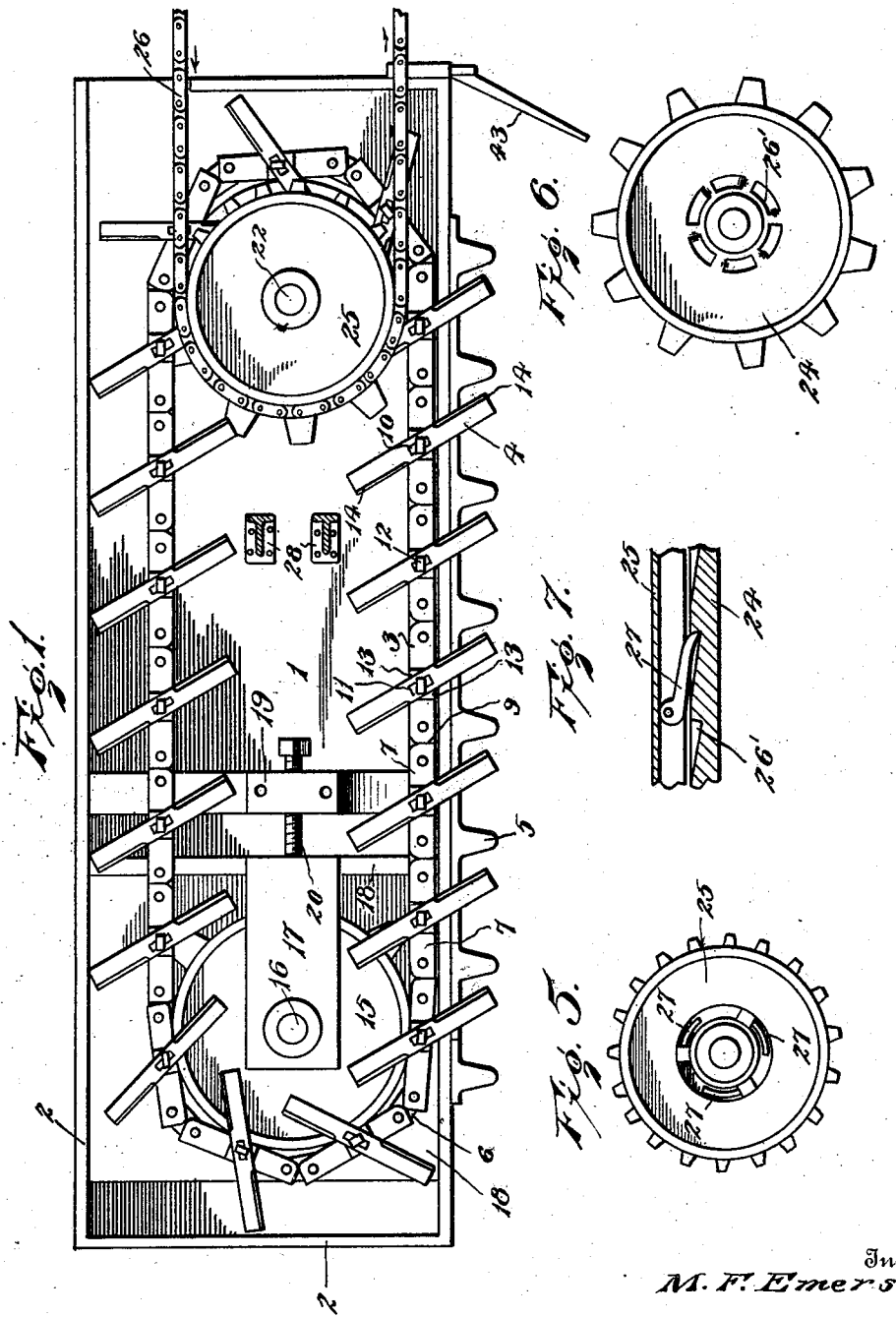
Inventor
M. F. Emerson
By Lacey & Lacey, Attorneys June 3, 1930.  M. F. EMERSON  1,760,939
MOWER
Filed April 26, 1929   2 Sheets-Sheet 2
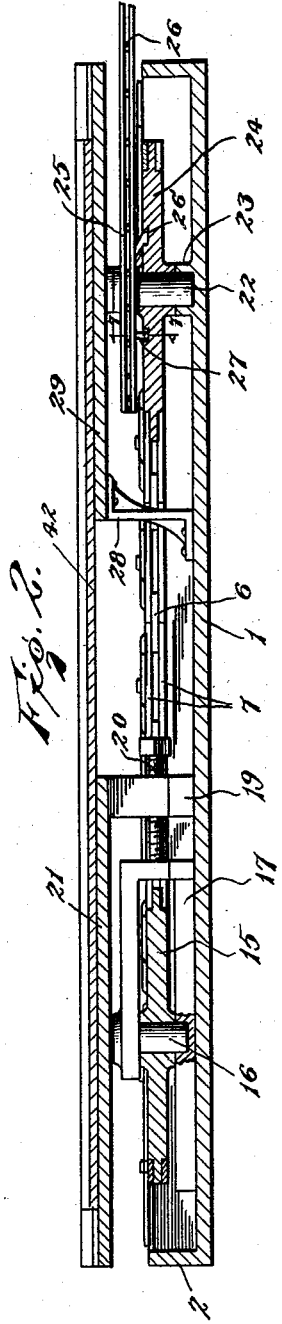
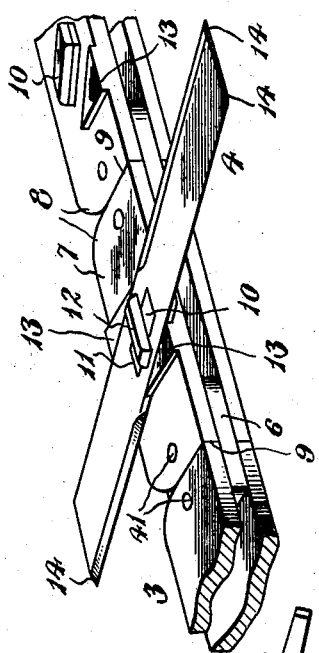
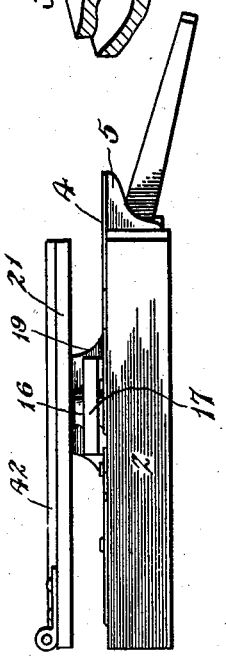
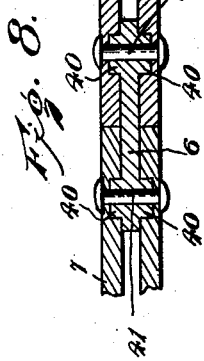
Inventor
M. F. Emerson
By Lacey & Lacey, Attorneys Patented June 3, 1930

1,760,939

UNITED STATES PATENT OFFICE

MILLARD F. EMERSON, OF RICHMOND, INDIANA

MOWER

Application filed April 26, 1929. Serial No. 358,346.

This invention relates to harvesting apparatus and one object is to provide an endless series of cutters which will operate continuously in one direction and thereby avoid the wear and noise and loss of time incident to a reciprocating cutter and due to the temporary stoppage and reversal of the direction of motion. The invention also has for its object the provision of a novel cutter and means whereby the proper position of the cutter will be automatically attained when the same is assembled with the driving agent, and a further object of the invention is to provide means whereby the cutter will remain at rest when the machine is being reversed or turned. Other objects of the invention will appear incidentally in the course of the following description, and the invention resides in certain novel features which will be particularly pointed out in the appended claims.

In the drawings:

Figure 1 is a plan view, with parts in section and parts removed, of a cutting apparatus embodying the present invention, Fig. 2 is a longitudinal section of the same, Fig. 3 is an end view, Fig. 4 is an enlarged detail perspective of a portion of the cutter chain, Fig. 5 is a bottom plan view of the driving gear member, Fig. 6 is a top plan view of the driven gear member, Fig. 7 is a detail section on the line 7—7 of Fig. 2, and Fig. 8 is a detail section.

In carrying out the invention, there is provided a frame consisting of a plate 1 and vertical rails or flanges 2 on the edges of said plate. This frame is secured upon the front of a harvester or other frame in any convenient manner and supports and houses an endless chain 3 carrying knives 4 which cooperate with guard fingers or stationary knives 5 secured upon the front side of the frame to effect the cutting operation. The chain 3 comprises a series of short coupling links 6 and longer knife-carrying links 7 which are pivoted at their ends to the coupling links and have their ends formed at their inner corners with convex surfaces 8 whereby they may turn relative to each other when passing around the actuating sprockets but having their front corners formed to make square butt joints, as shown at 9, whereby relative turning movement in the opposite direction will be prevented. The links 7 are preferably composed of upper and lower plates, as shown clearly in Figs. 2 and 4, so that strength in the chain is attained and the shorter coupling link 6 will be reinforced. By referring to Fig. 8, it will be noted that each coupling link 6 is formed with bosses 40 on its upper and lower sides which fit in sockets provided therefor in the opposed faces of the plates of the cooperating links 7, the pivots 41 being disposed coaxially through the bosses. By this arrangement, the pulling strain is all taken by the bosses, the pivot bolts or rivets merely holding the links together. The upper plate of each link 7 is provided at its center with a relatively obliquely disposed oblong lug 10 and each blade 4 is constructed at its center with a correspondingly shaped slot adapted to fit snugly over the lug 10, as shown at 11, whereby the blade will be set in the proper position relative to the chain and the guard fingers to cooperate with the guard fingers and effect a shearing cut upon the crop. Pivoted upon the lugs 10 are buttons 12 which in one position will lie within the outline of the lug so that the blade may be engaged over or removed from the lug, and in another position will extend transversely of the lug and project over the portions of the blade immediately adjacent the sides of the slot, as shown in Fig. 4, whereby the blade will be held in place. As a further means for properly positioning and bracing the blade, triangular lugs or projections 13 are formed on the upper sides of the links 7 at opposite sides of and adjacent the lugs 10, the distance between these lugs 13 and the lug 10 being such that, when the blade is engaged over the lug 10, it will fit closely between the lugs 13 so that it will be positively and automatically caused to assume the correct cutting position and will be braced against the strain imposed thereon during cutting. Each longitudinal edge of the blade is formed with two cutting portions 14 and the cutting portions upon the same edge as well as the cutting portions at the same end of the blade are oppositely beveled. By reason of this provision of a plurality of cutting surfaces and the relative reversed arrangement of the same, it is impossible to place a blade in position upon a chain so that a cutting edge will not be presented at the working end of the blade and in proper position to properly engage the crop. It will also be observed that each blade has four cutting edges and it will, consequently, have a long life inasmuch as it is possible to reverse the blade about its longitudinal axis and also about its transverse axis whereby to bring a new cutting surface into working position when a used surface has become too dull to perform effective work.

At one end of the frame is provided a sprocket wheel 15 which is mounted upon a pintle 16 fitted in a frame 17 which is slidably mounted upon the frame plate 1 and has a lower member resting on said plate and an upper member overhanging the sprocket, as shown in Fig. 2. The bottom of the frame is extended laterally, as shown at 18, whereby to engage against the side flanges or rails 2 and be guided thereby when it is being placed in position or being adjusted. Adjacent the end of the frame 17, a cross bar 19 is carried by the main frame and in said bar is mounted an adjusting bolt 20 which is engaged with the end of the frame 17 whereby rotation of the bolt will effect longitudinal movement of the frame and thereby compensate for wear upon the cutter chain. Secured upon the upper side of the cross bar 19 and projecting therefrom over the frame 17 and the sprocket is a cap plate 21 which serves to protect the frame and the chain and cutters from damage by chance blows or falling objects and also serves to prevent the pintle 16 from rising from the sprocket 15, as will be understood. At the opposite end of the frame is mounted a stud shaft 22 in a boss 23 on the frame plate 1 and fitted loosely about this stub shaft 22 and resting on said boss is a sprocket 24 about which the cutter chain is trained. Above the sprocket 24, a driving sprocket 25 is mounted upon the stub shaft 22 and this driving sprocket 25 is engaged by a sprocket chain 26 which may be actuated from the wheels of the harvester or from any other source of power. The sprocket 24 is provided in its upper side with a series of notches or recesses 26' arranged concentric with the hub thereof and on the under side of the sprocket 25 dogs 27 are pivoted to engage in said recesses. When the sprocket 25 is driven in one direction while the machine is advancing, the dogs will engage the shouldered ends of the recesses 26' and actuate the sprocket 24 and the cutter but when the machine is being reversed or is turning a corner the dogs will ride over the recesses 26' in the opposite direction and the cutter chain will remain at rest. Brackets 28 are secured upon the frame plate 1 and carry a cap plate 29 which projects over the sprocket 25 and the parts adjacent the same to protect the same from possible damage by chance blows or falling objects. The cap plates 21 and 29, furthermore, serve to hold the chains to their respective sprockets so that any tendency of the chains to ride from the sprockets will be counteracted.

A hood 42 is hinged at its rear edge upon the cap plates 21 and 29 to extend over and protect all the working parts, and the usual divider 43 may be employed.

It will be readily seen from the foregoing description, taken in connection with the accompanying drawings, that I have provided an exceedingly simple cutting apparatus which will operate continuously in one direction and in which the cutting blades will be necessarily fitted in the proper working position. Should any one blade be broken, it can be removed and a new blade substituted therefor in a very short period of time without any appreciable idleness of the machine.

Having thus described the invention, I claim:

1. A cutting apparatus comprising an endless chain, means for driving the chain, obliquely disposed lugs on the upper side of the several links of the chain, blades having longitudinal slots corresponding to said lugs and engageable thereover, and means for retaining the blades on the lugs.

2. Cutting apparatus comprising an endless chain, means for driving the chain, obliquely disposed lugs on the upper sides of the several links of the chain, guide lugs at the opposite sides of the first-mentioned lugs, blades provided centrally with slots corresponding to the first-mentioned lugs on the chain links and engageable thereover, the blades fitting closely between the second-mentioned lugs, and means for retaining the blades in engagement with the lugs.

3. A cutting apparatus comprising an endless chain, means for driving the chain, obliquely disposed angular lugs on the several links of the chain, guide lugs disposed on the links of the chain at opposite sides of said angular lugs, blades engageable over the angular lugs and between the guide lugs, and holding elements mounted on the first-mentioned lugs and adapted in one position to project beyond the same over the respective blades.

4. In a cutting apparatus, a relatively long flat blade having cutting portions upon its opposite side edges, there being two cutting portions upon each side edge and the cutting portions upon the same edge and at the same ends of the opposite edges being oppositely beveled.

5. In a cutting apparatus, an endless chain, blades carried by the several links of the chain, a sprocket engaged with said links to actuate the same and provided with ratchet recesses in its upper side, a driving member disposed above and coaxially with said sprocket, and a dog mounted on the under side of the driving member and adapted to engage the ratchet recesses in the driven sprocket.

In testimony whereof I affix my signature.

MILLARD F. EMERSON. [L. S.]